Figure 1:
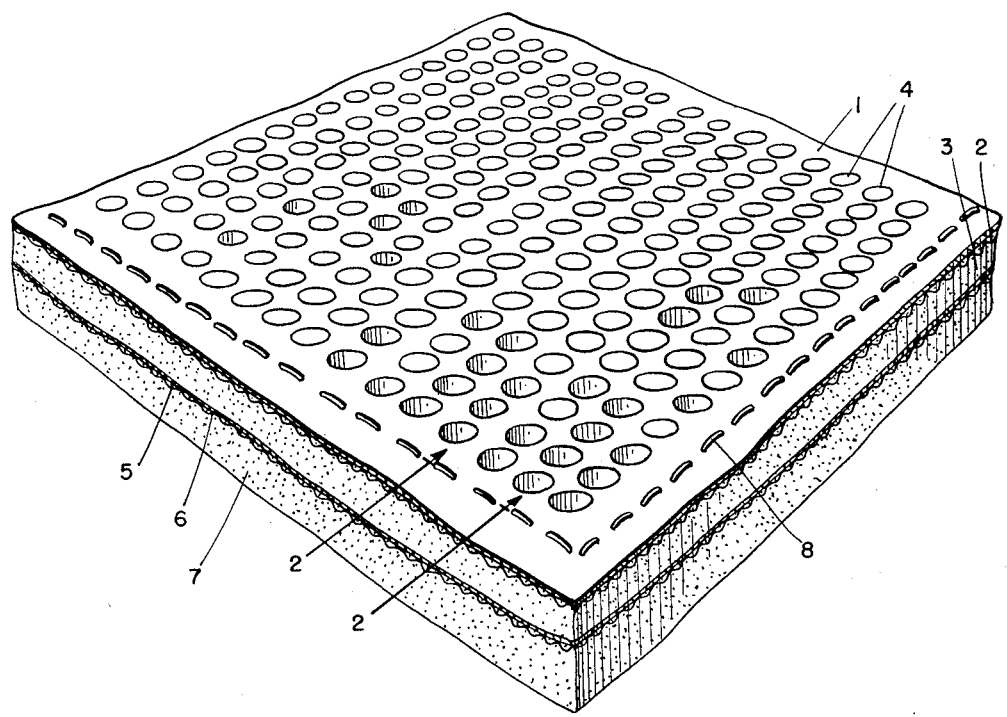

Dec. 13, 1955

T. S. SEE ET AL 2,726,977

HEAT REFLECTIVE COMPOSITE FABRIC

Filed April 3, 1952

*INVENTORS:*
THEODORE S. SEE
HORACE A. FROMMELT
BY *Spencer Johnston,*
*Cook & Root*

ATT'YS

United States Patent Office 2,726,977
Patented Dec. 13, 1955

2,726,977

HEAT REFLECTIVE COMPOSITE FABRIC

Theodore S. See, Hammond, Ind., and Horace A. Frommelt, Milwaukee, Wis.

Application April 3, 1952, Serial No. 280,444

4 Claims. (Cl. 154—44)

This invention relates to heat reflection and more particularly to a foil-faced heat reflective and insulative material.

It is already recognized that surfaces may be protected from excessive heat by the use of insulating materials such as asbestos, glass fiber and the like. These materials are known to be effective in preventing the transmission of conducted heat, i. e., the heat which is carried from molecule to molecule in the atmosphere or in a substance. There is another type of heat, however, which is considerably more intense than conducted heat and which emanates from hot surfaces. This heat is known as radiant heat and is transmitted in waves similar to light waves, and this type of heat is capable of passing through the atmosphere without depending upon molecule to molecule transmission. For example, a bar of steel at red heat of about 2000° F. will give off large quantities of radiant heat in waves which are capable of transmission over a relatively long distance.

It is an object of this invention to provide a composite material which will reflect radiant heat of the type described above.

Another object of the invention is to provide a material which will reflect radiant heat and insulate against radiant heat and conducted heat.

A further object of the invention is to provide a method of making an effective heat insulating and reflecting composite material.

The foregoing and numerous other important objects, advantages, and inherent functions of the invention will become apparent as the same is more fully understood from the following description, which, taken in connection with the accompanying drawings, discloses a preferred embodiment of the invention.

Figure 2:
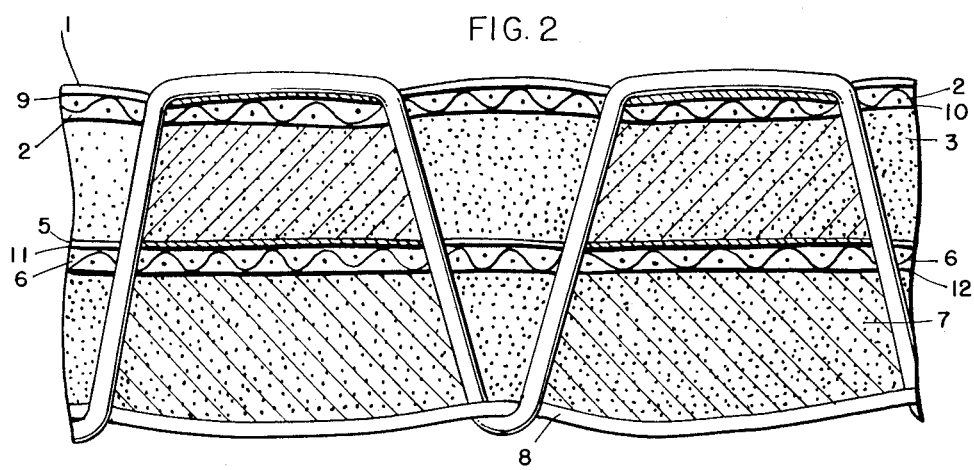

In the drawings:

Figure 1 is a perspective view of a piece of the composite material of this invention; and Figure 2 is a sectional view taken along the lines 2—2 of Figure 1.

In accomplishing the foregoing objects and according to the present invention there is now provided a material which interrupts the passage of both radiant heat and conducted heat in a most effective manner. The material comprises a layer which is built up of a sheet of fabric, a sheet of metallic foil laminated to one side of the fabric and a batt of glass fibers secured to the other side thereof. A second layer of the same construction but having a plurality of perforations therethrough is joined to the first layer in such manner that the perforated foil surface faces outwardly and the imperforate foil sheet is visible through the perforations in the second layer.

Referring to the drawings in greater detail, Figure 1 shows a preferred embodiment of the composite material of this invention in which the perforate foil sheet 1 is laminated to a fabric 2. Then a layer of glass fiber 3, hereinafter referred to as a batt, is secured to the fabric 2 by any suitable method such as by gluing, sewing and the like. A large number of perforations 4—4 are cut through the layer of foil, fabric and glass batt. A second layer is located beneath the previously described layer and comprises an imperforate sheet 5 of metallic foil laminated to a fabric backing material 6. A batt of glass fibers 7 is attached to the underside of the fabric 6. The two layers which are joined to form the composite material are joined by means of the heavy thread 8 which is stitched around the edges of the material and may cross the material if desired.

In Figure 2 the composite material is shown in greater detail and it will be observed that a layer of laminating adhesive 9 is located between the foil 1 and the fabric 2. Similarly a layer of adhesive 10 is illustrated as joining the fabric 2 and the batt 3. The same construction is repeated in the lower layer in which a layer of adhesive 11 is interposed between the foil 5 and the fabric 6. A layer of adhesive 12 joins the fabric 6 and the batt 7. The thread 8 passes through both layers and joins them into a composite material.

The metallic foil referred to above as the foil sheets 1 and 5 may be made from aluminum, silver, gold, tin or copper. Aluminum foil is inexpensive and serves very well to interrupt and reflect the waves of radiant heat emanating from a heat source. The foil may be of any suitable thickness and ordinarily it will be satisfactory to use a foil several thousandths of an inch in thickness. It is unusual that the metallic foils employed herein will be so effective in interrupting and reflecting the radiant heat waves because the metals from which these foils are made are among the best known heat conductors. It should be remembered, however, that the foils act upon radiant heat and are not employed herein for their heat conductive properties. With aluminum foil it has been found that the leakage of radiant heat or radiant energy through the foil is very slight and measures something on the order of 3%. In the composite material disclosed herein the glass batt effectively traps the remainder of radiant heat which may leak through the foil and at the same time prevents the passage of conducted heat therethrough.

In the preferred embodiment of the invention it has been disclosed that the upper layer of the material has a large number of perforations therethrough. It has been found that this method provides more effective interruption and reflection of the radiant heat since a part of the radiant heat will be reflected from the surface of the perforated foil and the remainder of the heat waves will be reflected from the imperforate foil. The heat waves, both radiant and conductive, are more readily dissipated, reflected and trapped in the composite material disclosed herein than is otherwise possible.

The fabric in the composite material is employed primarily as a backing material in order to lend strength and flexibility to the product. While it is contemplated that any suitable woven fabric may be employed, it is preferred to use a fabric which is fire-resistant or which has been treated to make it fire resistant, such as duck, canvas, wool, nylon, and the like. Woven glass fabric is particularly suitable since it not only is strong and fire-resistant, but it has heat insulating properties of its own.

The glass fiber batts which are used in the composite material are composed of a large number of short lengths of glass filament which are matted together and loosely bonded by the use of a synthetic resin. In the present instance it is more desirable to use a thermosetting resin but thermoplastic resins may also be employed where temperatures will not be severe enough to result in complete melting of the resin.

Since the composite material of the present invention is flexible and may be formed in relatively thin layers, it is admirably suited for application to contoured surfaces. One of the uses contemplated for the material is as an insulative covering over motor housings, bearings, shafts, spindles and other pieces of equipment which are subjected to high radiant heats. For example in hot milling of steel bars it is desirable to cover the essential parts of the milling machine, such as the motor, bearings and spindle, by wrapping a layer of the composite material of this invention around the exposed surfaces of these parts. The radiant heat emanating from the hot bar is effectively interrupted and reflected so that a bearing will remain cool when surrounded by the composite material even though it be close to the hot bar. It is necessary only that the foil surface be separated from the hot source by a slight clearance. A clearance of several thousandths of an inch is enough in some instances but usually a clearance of one-half inch or more will be employed. Many other uses are contemplated for the material and in general it may be stated that the material is satisfactory for the protection of any surface, either flat or contoured, which is normally subject to high radiant heats.

It is though that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A heat insulative and reflective composite flexible material which comprises a first, imperforate layer consisting essentially of a sheet of fabric, a sheet of metallic foil laminated to one side of said fabric and a batt of glass fibers secured to the other side of said fabric, and a second layer of the same construction as and superimposed over the first layer but having a plurality of perforations therethrough, said layers being joined with the perforate foil sheet facing outwardly and the imperforate foil sheet visible through said perforations.

2. A heat insulative and reflective composite flexible material which comprises a first, imperforate layer consisting essentially of a sheet of woven fabric, a sheet of metallic foil laminated to one side of said fabric and a batt of glass fibers adhesively secured to the other side of said fabric, and a second layer of the same construction as and superimposed over the first layer but having a plurality of perforations therethrough, said layers being joined with the perforate foil sheet facing outwardly and the imperforate foil sheet visible through said perforations.

3. A heat insulative and reflective composite flexible material which comprises a first, imperforate layer consisting essentially of a sheet of woven fabric, a sheet of bright aluminum foil laminated to one side of said fabric and a batt of glass fibers adhesively secured to the other side of said fabric, and a second layer of the same construction as and superimposed over the first layer but having a plurality of perforations therethrough, said layers being joined with the perforate foil sheet facing outwardly and the imperforate foil sheet visible through said perforations.

4. The material of claim 3 in which the fabric is a woven glass fabric.

References Cited in the file of this patent
UNITED STATES PATENTS

| | | |
|---|---|---|
| 2,030,668 | Weyerhaeuser et al. | Feb. 11, 1936 |
| 2,137,756 | Gould et al. | Nov. 22, 1938 |
| 2,177,393 | Parkinson | Oct. 24, 1939 |
| 2,540,331 | Hlavaty | Feb. 6, 1951 |
| 2,561,891 | Tucker | July 24, 1951 |
| 2,562,711 | Gessler et al. | July 31, 1951 |
| 2,579,964 | Reynolds | Dec. 25, 1951 |

FOREIGN PATENTS

| | | |
|---|---|---|
| 446,943 | Great Britain | May 8, 1936 |
| 459,980 | Great Britain | Jan. 19, 1937 |
| 482,809 | Great Britain | Jan. 5, 1938 |